(12) United States Patent
Creta et al.

(10) Patent No.: US 7,210,000 B2
(45) Date of Patent: Apr. 24, 2007

(54) TRANSMITTING PEER-TO-PEER TRANSACTIONS THROUGH A COHERENT INTERFACE

(75) Inventors: Kenneth C. Creta, Gig Harbor, WA (US); Robert G. Blankenship, Tacoma, WA (US); Sridhar Muthrasanallur, Tumwater, WA (US); Jasmin Ajanovic, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 10/832,607

(22) Filed: Apr. 27, 2004

(65) Prior Publication Data

US 2005/0251611 A1   Nov. 10, 2005

(51) Int. Cl.
*G06F 13/00* (2006.01)
*H03M 13/00* (2006.01)

(52) U.S. Cl. ............... 710/316; 710/106; 709/238; 370/356

(58) Field of Classification Search ......... 709/238, 709/250, 206, 227, 220, 201; 710/30, 105, 710/316; 370/398, 235, 362, 401, 389, 392, 370/338; 711/144, 163; 726/15; 714/758
See application file for complete search history.

(56) References Cited

U.S. PATENT DOCUMENTS

| | | | | |
|---|---|---|---|---|
| 5,826,023 A * | 10/1998 | Hall et al. | .................. | 709/206 |
| 5,935,268 A * | 8/1999 | Weaver | ...................... | 714/758 |
| 6,145,039 A * | 11/2000 | Ajanovic et al. | ........... | 710/105 |
| 6,175,884 B1 * | 1/2001 | Harriman et al. | .............. | 710/30 |
| 6,243,781 B1 | 6/2001 | Gandhi et al. | ............... | 710/129 |
| 6,272,551 B1 * | 8/2001 | Martin et al. | ................ | 709/250 |
| 6,272,563 B1 | 8/2001 | Ajanovic et al. | ............. | 710/29 |
| 6,292,839 B1 * | 9/2001 | Naudus et al. | .............. | 709/238 |
| 6,333,929 B1 * | 12/2001 | Drottar et al. | .............. | 370/362 |
| 6,516,375 B1 | 2/2003 | Ajanovic et al. | ........... | 710/305 |
| 6,629,213 B1 * | 9/2003 | Sharma | ...................... | 711/144 |
| 6,681,292 B2 | 1/2004 | Creta et al. | .................. | 711/119 |
| 6,816,952 B1 * | 11/2004 | Vartti et al. | ................. | 711/163 |
| 6,865,184 B2 * | 3/2005 | Thubert et al. | .............. | 370/401 |
| 6,886,103 B1 * | 4/2005 | Brustoloni et al. | ........... | 726/15 |
| 7,020,084 B1 * | 3/2006 | Tanaka et al. | .............. | 370/235 |
| 2002/0141418 A1 * | 10/2002 | Ben-Dor et al. | ............ | 370/398 |
| 2003/0061314 A1 * | 3/2003 | Wang | ......................... | 709/220 |
| 2003/0188072 A1 | 10/2003 | Creta et al. | .................. | 710/306 |

(Continued)

OTHER PUBLICATIONS

Co-Pending U.S. Appl. No. 10/832,606, filed Apr. 27, 2004, entitled "Globally Unique Transaction Identifiers" by Herbert H. Hum, et al.

(Continued)

*Primary Examiner*—Christopher E. Lee
(74) *Attorney, Agent, or Firm*—Trop, Pruner & Hu, P.C.

(57) ABSTRACT

In various embodiments, the present invention includes a method for receiving a transaction having first header information from a first peer device at a first agent of a coherent system, inserting second header information onto the transaction, and routing the transaction to a second peer device using the second header information. In one such embodiment, the first header may be a header of a first protocol and the second header may be of a different protocol that is used to tunnel the transaction through the coherent system.

29 Claims, 8 Drawing Sheets

U.S. PATENT DOCUMENTS

| | | | |
|---|---|---|---|
| 2004/0066770 A1* | 4/2004 | Pabla et al. | 370/338 |
| 2004/0098447 A1* | 5/2004 | Verbeke et al. | 709/201 |
| 2004/0179529 A1* | 9/2004 | Pettey et al. | 370/392 |
| 2004/0213226 A1* | 10/2004 | Frank et al. | 370/389 |
| 2005/0108403 A1* | 5/2005 | Jaiswal et al. | 709/227 |

OTHER PUBLICATIONS

Co-Pending U.S. Appl. No. 10/833,236, filed Apr. 27, 2004, entitled "Separating Tranactions Into Different Virtual Channels" by Kenneth C. Creta, et al.

* cited by examiner

TRANSMITTING PEER-TO-PEER TRANSACTIONS THROUGH A COHERENT INTERFACE

BACKGROUND

The present invention relates to data communication, and more particularly to communication between peer-to-peer devices coupled to a system.

Most computer systems are formed of components coupled together using one or more buses, which are used to transmit information between the various system components. Present bus standards such as the Peripheral Component Interconnect (PCI) Specification, Rev. 2.1 (published Jun. 1, 1995) provide a multi-drop bus in which multiple devices may be coupled to the same bus. Accordingly, it is easy to read or write to devices on the same bus.

However, as bus interface speeds increase, bus architectures are moving away from multi-drop architectures towards point-to-point architectures. In such point-to-point architectures, peer-to-peer communication becomes more difficult, as synchronization, ordering, and coherency of such communications becomes more difficult.

Furthermore, such point-to-point architectures may include components using different communication protocols, such that communication between these different components is also difficult. For example, peer-to-peer communication between input/output (I/O) devices may be sent according to a first protocol, but due to the point-to-point architecture and protocols used by other components between the I/O devices, such communication becomes difficult. Typically, such a transaction may be translated from the first bus protocol into equivalent commands of a second (i.e., non-native) bus protocol and forwarded through to the desired target peer device. However, such operations may cause a significant loss of information, including header information of the first bus protocol. Such information loss may negatively affect performance and reliability, such as a system error recovery/debug. Thus a need exists to better transfer data transactions between peer devices, particularly where the transactions pass through a fabric non-native to the peer devices.

DETAILED DESCRIPTION

Figure 1:
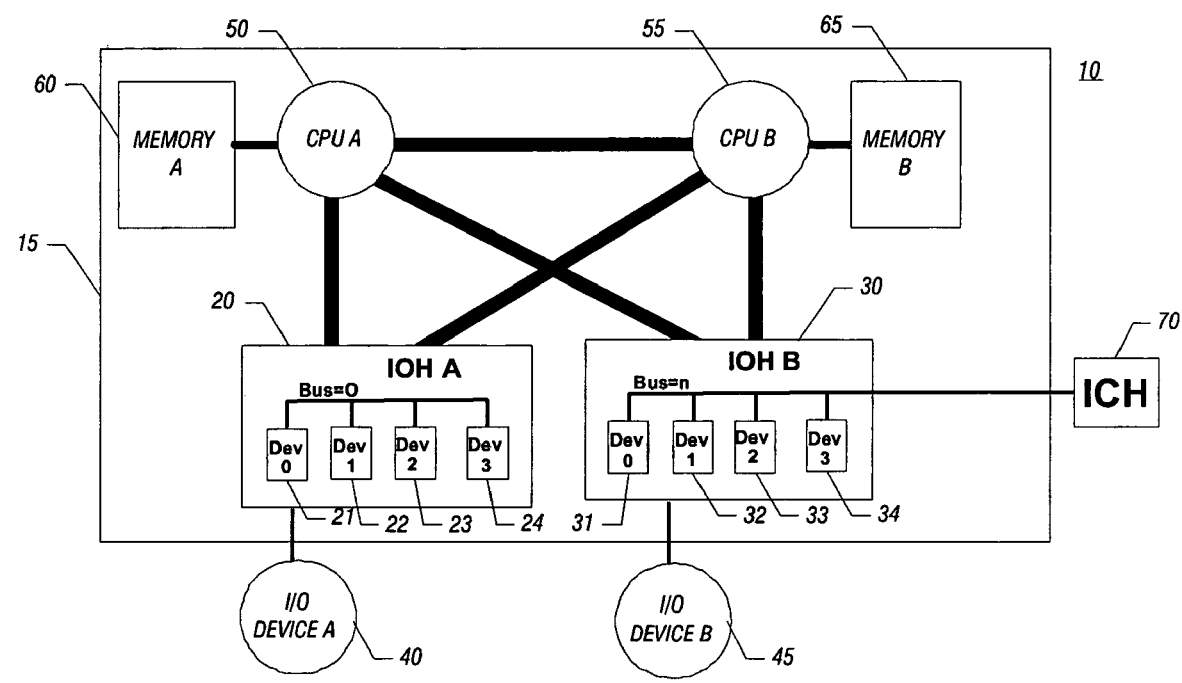
FIG. 1 is a block diagram of a system in accordance with one embodiment of the present invention.

Referring to FIG. 1, shown is a block diagram of a system in accordance with one embodiment of the present invention. As shown in FIG. 1, system 10 may be a multiprocessor system including a coherent interface in accordance with an embodiment of the present invention. That is, system 10 may represent any one of a desired desktop, mobile, server platform or other such platform, in different embodiments. In certain embodiments, interconnections between different components of FIG. 1 may be point-to-point interconnects that provide for coherent shared memory within system 10, and in one such embodiment the interconnects and protocols used to communicate therebetween may form a common system interface (CSI). In such manner, multiple processors, memories, and other components of system 10 may coherently interface with each other.

Referring to FIG. 1, system 10 may include a first processor 50 (CPU A) and a second processor 55 (CPU B). In various embodiments, each processor may include memory controller functionality such that the processors may directly interface with an associated shared memory via a point-to-point interconnect. For example, as shown in FIG. 1, processor 50 may be coupled to a memory 60 (memory A) via a point-to-point interconnect and processor 55 may be coupled to a memory 65 (memory B) via a similar point-to-point interconnect. More so, processors 50 and 55 may also be coupled to each other via a point-to-point interconnect. Similarly, each of processors 50 and 55 may be coupled via point-to-point interconnects to each of a first input/output hub (IOH A) 20 and a second IOH 30 (IOH B).

In the embodiment of FIG. 1, all components within box 15 may collectively form a coherent system (i.e., coherent system 15). Such a coherent system may accommodate coherent transactions without any ordering between channels through which transactions flow. While discussed herein as a coherent system, it is to be understood that both coherent and non-coherent transactions may be passed through and acted upon by components within the system. For example, a region of one or both of memories 60 and 65 may be reserved for non-coherent transactions. While the embodiment of FIG. 1 shows a platform topology having two processors and two I/O hubs, it is to be understood that other embodiments may include more or fewer such components. For example, a single processor system may be implemented having a single processor, a single I/O hub and associated I/O devices coupled thereto. Alternately, a multiprocessor system having 4, 8, 16, 32 or another number of processors may be implemented, and an appropriate number of I/O hubs and other components may be coupled thereto. Any such platform topologies may take advantage of point-to-point interconnections to provide for coherency within a coherent portion of the system, and also permit non-coherent peer-to-peer transactions between I/O devices coupled thereto. Such point-to-point interconnects may thus provide multiple paths between components.

As shown in FIG. 1, I/O hubs 20 and 30 may each include a plurality of ports (e.g., ports 21–24 in IOH 20 and ports 31–34 in IOH 30) to interface with I/O devices coupled thereto. For example, in certain embodiments, such I/O devices may be devices in accordance with one or more bus schemes. In one embodiment, such I/O devices may be Peripheral Component Interconnect (PCI) Express™ devices in accordance with the PCI Express Base Specification version 1.0a, (published July 2002). As used herein, such devices may be referred to as "PCI-E" devices.

For simplicity, FIG. 1 shows a single I/O device coupled to each I/O hub, namely I/O device (I/O device A) 40 coupled via port 21 to IOH 20 and I/O device (I/O device B) 45 coupled via port 31 to IOH 30. It is to be understood that the number of ports in an I/O hub in accordance with an embodiment of the present invention may vary, and the number of ports and devices coupled thereto shown in FIG. 1 are for illustrative purposes only.

Also shown in FIG. 1 is a legacy I/O controller hub (ICH) 70 coupled to IOH 30. In one embodiment, ICH 70 may be used to couple legacy devices such as a keyboard, mouse, and Universal Serial Bus (USB) devices (e.g., devices in accordance with the USB Specification Rev. 2.0 (published December 2000)) to coherent system 15.

While the I/O hubs shown in FIG. 1 include a plurality of ports, it is to be understood that the hubs may realize various functions using a combination of hardware, firmware and software. Such hardware and software may be used so that the I/O hub may act as an interface between coherent system 15 (e.g., shared memories 60 and 65, processors 50 and 55, and IOHs 20 and 30), and devices coupled thereto such as I/O devices 40 and 45. In addition, the I/O hubs of FIG. 1 may be used to support various bus or other communication protocols of devices coupled thereto. IOH 20 and IOH 30 may act as agents to provide a central connection between two or more communication links. In particular, IOH 20 and IOH 30 may be referred to as "CSI agents" that provide a connection between different I/O devices coupled to coherent system 15. In various embodiments, other components within coherent system 15 may also act as CSI agents.

In various embodiments, each port of I/O hubs 20 and 30 may include a plurality of channels to communicate data, control and status information between various devices. In one particular embodiment, each port may include at least three such channels, including a standard channel, a bypass channel, and a completion channel. In certain such embodiments, additional channels may be present for coherent transfers, and the three channels described above may be non-coherent channels. In such manner, transactions flowing between devices may avoid deadlocks that may occur when posted transactions become delayed behind non-posted transactions, such as reads.

Figure 2:
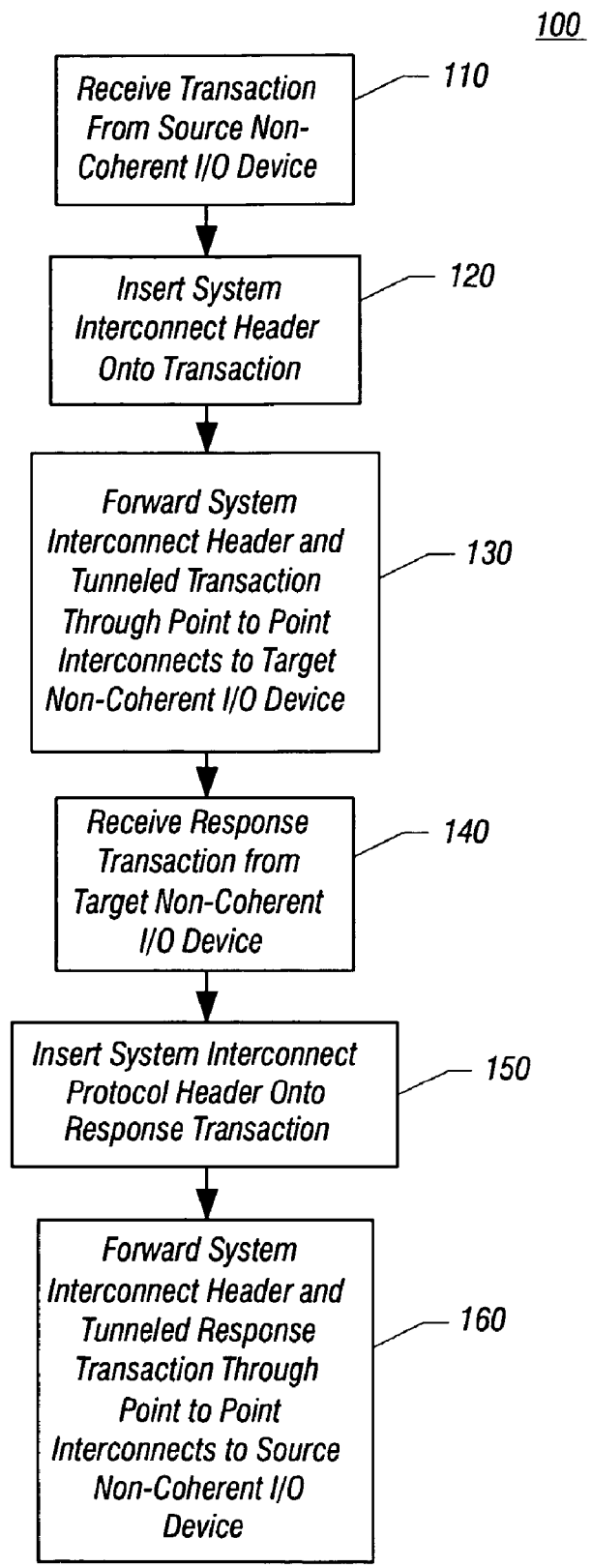
FIG. 2 is a flow diagram of a method in accordance with one embodiment of the present invention.

Referring now to FIG. 2, shown is a flow diagram of a method in accordance with one embodiment of the present invention. As shown in FIG. 2, method 100 begins by receiving a non-coherent transaction from a source I/O device (i.e., a "source non-coherent I/O device") (block 110). For example, a PCI-E device coupled to an I/O hub in accordance with an embodiment of the present invention may desire to communicate a peer-to-peer transaction to a target PCI-E device coupled to a different I/O hub (i.e., a "target non-coherent I/O device"). In such an example, the PCI-E device may transmit a transaction having a PCI-E header and associated data, if the transaction seeks to write data to the target I/O device.

Still referring to FIG. 2, upon receipt of the transaction in an I/O hub, the I/O hub may insert a system interconnect header (also referred to herein as a "common system header" or a "CSI header") on the transaction (block 120). While such a system interconnect header may vary in different embodiments, in one embodiment the system interconnect header may include node and transaction identification information, routing information and other associated information to enable various point-to-point devices interconnected with the I/O hub to decode the coherent protocol information and route the associated PCI-E transaction to the desired target I/O device.

Thus after inserting such a system interconnect header, the I/O hub may forward the coherent header and the tunneled transaction through various point-to-point interconnects to the target I/O device (block 130). For example, in the embodiment of FIG. 1, I/O hub 20 may forward a transaction from I/O device 40 through I/O hub 30 (e.g., through one or more of processors 50 and 55) to the desired target I/O device 45. The tunneled transaction may include the original PCI-E header and its associated data (if present) so that I/O hub 30 may decode the PCI-E header (in addition to the coherent system header) and route the transaction to the proper target I/O device.

Then, the target I/O device may perform the action requested by the source I/O device. Such action may include, for example, writing or reading data to/from the target I/O device, obtaining desired information from other devices to which the I/O device is coupled, or another such action. Then the target I/O device may send a response transaction back to the source I/O device (if required).

Referring still to FIG. 2, the response transaction may be received from the target I/O device (block 140). In the example of FIG. 1, I/O hub 30 may receive a response transaction from I/O device 45 which may be in a PCI-E format. Next, I/O hub 30 may insert a system interconnect header onto the response transaction (block 150). Then, the system interconnect header and the tunneled transaction may be forwarded through one or more point-to-point interconnects so that the response transaction is provided to the source I/O device (block 160). In the example above, the response transaction may thus be provided through coherent system 15 to I/O device 40 of FIG. 1 using the system interconnect header.

In such manner, non-coherent peer-to-peer transactions between I/O devices may be forwarded through a fabric of coherent system 15 (e.g., a "CSI fabric" or "common system fabric"). Multiple devices within the CSI fabric may forward non-coherent transactions between devices without translating the transactions. As a result, the original transaction information is maintained and may be used for purposes of logging of errors or other information regarding devices involved in the transaction. Such information may be used in debugging or other error detection and correction mechanisms. Similarly, forward compatibility may be preserved such that when an I/O interface adds new parameters to transactions, the CSI fabric may preserve the information when tunneling the transactions.

While data tunneling in accordance with an embodiment of the present invention may be performed for various types of non-coherent protocols, in one embodiment, such data tunneling may be performed for PCI-E I/O devices coupled to a coherent system. Transactions may be carried out between source and target PCI-E devices (i.e., requesters and completers) using four separate address spaces, namely memory, I/O, configuration, and message spaces. Memory address space may be used to transfer data to or from a location in system memory. I/O address space may be used to transfer data to or from a location in a system I/O map. Configuration address space may be used to transfer data to or from a location in the configuration space of a PCI compatible device, and message address space may be used for generic in-band messaging and event reporting. In various embodiments, data tunneling may be performed on transactions relating to any of these address spaces, or address spaces for use with other protocols and specifications.

By tunneling the PCI-E transactions, various attributes may be preserved, including, for example, ordering attributes, requester identification, and the like. In certain embodiments, the PCI-E header may be 20 bytes long, including a 16 byte PCI-E header and four bytes of an end-to-end cyclic recovery check (CRC). Further, if the transaction is a write transaction, data may be appended to the PCI-E header. When such a PCI-E transaction is received by an I/O hub in accordance with an embodiment of the present invention, a common system header may be appended to the tunneled transaction. In certain embodiments, two such common system headers may be attached which, in certain embodiments, may be 16 bytes long. In such an embodiment, the first common system header may include header information for a standard virtual channel for transactions in which no data is included with PCI-E transaction. The second common system header may be a header for a bypass virtual channel for PCI-E transactions in which data is transmitted therewith (e.g., a write transaction). An example packet is shown in connection with FIG. 8, discussed below.

In various embodiments, the added common system headers may be used to route the tunneled transactions through various point-to-point interconnects of a coherent system to a target device. I/O hubs in accordance with a desired embodiment may decode both the common system header and the PCI-E header to determine the proper target I/O device. However, other components in the coherent system may simply use the common system headers to route tunneled transactions. That is, in certain embodiments, coherent components other than I/O hubs need not translate or decode the PCI-E header or any appended data.

In certain embodiments, peer-to-peer write transactions between a requester I/O device and a completer I/O device may be performed. In one embodiment, such a write transaction may be routed through a source I/O hub on a bypass channel of a virtual network of the coherent system. The I/O hub may insert a common system header onto the tunneled PCI-E transaction which, in one embodiment may include a common system header, a tunneled PCI-E header and eight data flits. However, in other embodiments other byte alignments may be performed. As used herein the term "data flit" refers to a smallest unit of data transfer. More so, in certain embodiments, a data length up to a cacheline width (e.g., 64 bytes in one embodiment) may be used and if a lesser amount of data is present, unused bytes may be filled with zeros.

In one embodiment, a write transaction may be posted on the PCI-E side but not posted in the coherent system. Accordingly, source serialization or ordering forks using reordering logic may be provided within an I/O hub so that the write transaction is properly ordered when it is received by the requester peer device. Such a transaction may be completed by a target I/O hub, with a source I/O hub splitting writes into less than or equal to cacheline quantums, although the scope of the present invention is not so limited. In certain embodiments, the target I/O hub may coalesce writes using a length field present in the PCI-E tunneled header. In certain embodiments, completions may be sent via a separate channel (e.g., a no data response (NDR) channel) such that deadlocks may be avoided.

Figure 3:
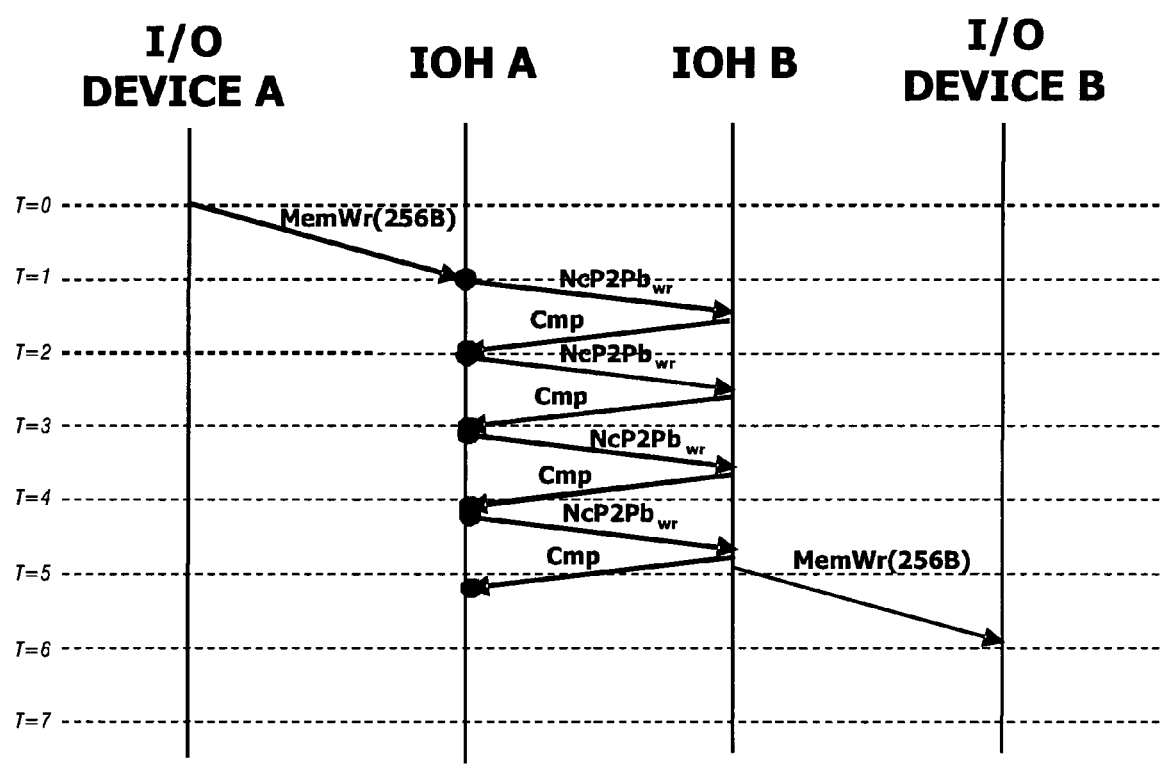
FIG. 3 is a timing diagram of a peer-to-peer memory write transaction in accordance with an embodiment of the present invention.

Referring now to FIG. 3, shown is a timing diagram of a peer-to-peer memory write transaction in accordance with an embodiment of the present invention. Such a peer-to-peer memory write may be between non-coherent peer devices coupled to a coherent system. However, it is to be understood that in other embodiments, I/O devices coupled to the coherent system may also be coherent. In alternate embodiments, other arrangements may be present, such as transmission of peer-to-peer transactions between a coherent device on one side and a non-coherent device on the other side. Similarly, other embodiments may contemplate transmission of transactions having first protocol information through a coherent or other system having a second protocol different than the first.

As shown in FIG. 3, a memory write may be initiated by an I/O device (i.e., I/O device A) sending a memory write transaction (MemWr) at an initial time (i.e., at time T=0). A plurality of different times T=1 through T=7 are shown. It is to be understood that such times are for illustrative purposes only, and do not represent machine cycles or other actual timing patterns. Instead, the timing diagram of FIG. 3 is to illustrate the sequential flow of a memory write transaction over time.

In one embodiment, the timing diagram of FIG. 3 may represent a serialized peer-to-peer memory write transaction. For example, with reference to the block diagram of FIG. 1, I/O device 40 may transmit a memory write transaction desired for I/O device 45. Such a transaction may flow from I/O device 40 to I/O hub 20 (and through one or more intervening point-to-point interconnections) to I/O hub 30 and finally to target completer I/O device 45. Thus as shown in FIG. 3, the timing diagram indicates at the different vertical lines transmission of transactions or packets between I/O device A (e.g., corresponding to I/O device 40 of FIG. 1), an I/O hub A (e.g., corresponding to I/O hub 20 of FIG. 1), an I/O hub B (e.g., corresponding to I/O hub 30 of FIG. 1), and I/O device B (e.g., corresponding to I/O device 45 of FIG. 1).

As shown in FIG. 3, the memory write may be a write transaction that includes 256 bytes of data, although the scope of the present invention is not so limited. Upon receipt by I/O hub A, the transaction may be split into data packets each having a length less than or equal to a cacheline size. In the embodiment shown in FIG. 3, the transaction may be split into four separate packets, each including 64 bytes of data. Such a splitting operation may be performed by a cacheline splitter in I/O hub A, which may include circuitry and logic to enable such splitting of incoming data. While shown as splitting the data into four packets of 64 bytes, it is to be understood that different splittings may be possible in other embodiments.

At time T=1, I/O hub A may transmit the first 64 bytes of the write data to I/O hub B in a packet having a common system header and the tunneled PCI-E header, in addition to the data. As shown in FIG. 3, the packet may be a non-coherent peer-to-peer write packet traveling on a bypass virtual channel (NcP2Pb$_{wr}$). While shown in FIG. 3 as using such a bypass channel, it is to be understood that in other embodiments a different virtual channel of the coherent system may be used. Upon receipt by I/O hub B, I/O hub B may transmit a completion (Cmp) back to I/O hub A, indicating its receipt and proper ordering of the first packet. In certain embodiments, such a completion maybe transmitted on a separate completion channel to avoid deadlocks. For example, in one embodiment such completions may use a NDR channel. Of course, a different channel may be used in other embodiments. Upon receipt of the completion, I/O hub A then sends a second tunneled data packet along with a common system header to I/O hub B. In like manner, I/O hub B sends another completion back to I/O hub A. Such successive write and completion transactions may occur between I/O hubs A and B until the entire 256 bytes are received by I/O hub B.

In certain embodiments, I/O hub B may optionally combine the individual packets into a combined packet. Then at (approximately) T=5, I/O hub B transmits the full 256 byte data packet to the target I/O device as MemWr. In such embodiments, I/O hub B may include buffers and logic to combine the different packets into a single data packet and order such packets appropriately. Thus, peer-to-peer memory writes may be performed in a serialized fashion, in certain embodiments.

Figure 4:
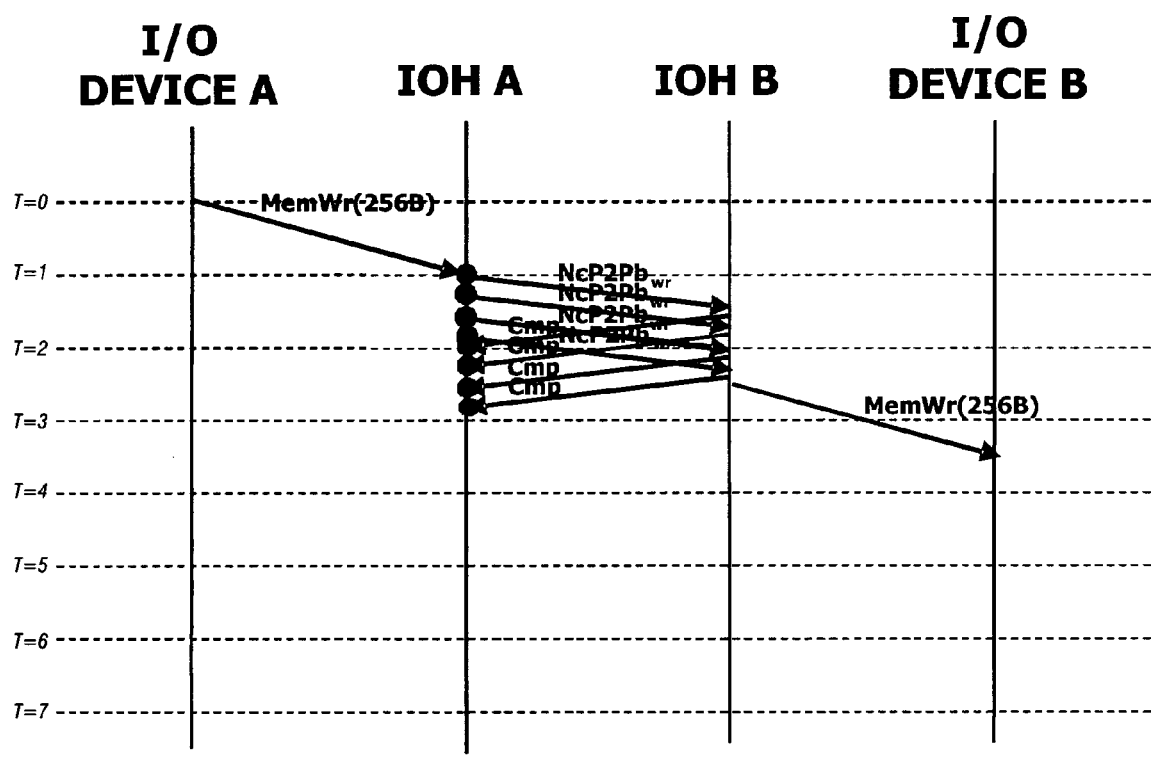
FIG. 4 is a timing diagram of a peer-to-peer memory write transaction in accordance with another embodiment of the present invention.

Referring now to FIG. 4, shown is a timing diagram of a peer-to-peer memory write transaction from a first I/O device to a second I/O device in accordance with another embodiment of the present invention. In the embodiment of FIG. 4, the memory write may be performed using ordering forks. Referring to FIG. 4, a source I/O device (i.e., I/O device A) may transmit a memory write transaction to a first I/O hub (i.e., IOH A) at time T=0. As shown in the embodiment of FIG. 4, the write data may include 256 bytes. Between times T=1 and T=2, the first I/O hub will forward four non-coherent point-to-point packets, each including a common system header and the tunneled PCI-E header, along with a portion of the data to be written. In one embodiment, the packets may use a non-coherent point-to-point bypass channel (i.e., $NcP2Pb_{wr}$). In the embodiment shown in FIG. 4, each of the four packets may include 64 bytes of the underlying data.

Upon receipt of each packet in the second I/O hub (i.e., IOH B), the second I/O hub may send a completion back to the first I/O hub. In certain embodiments, such completion may be sent on a separate completion channel (e.g., a Cmp channel) to avoid deadlock situations. The second I/O hub may combine and reorder the different packets received based on address and length information contained therein (e.g., PCI-E header information). Such reordering may be performed using reordering logic within the second I/O hub. Upon combining the four packets into a single packet, the second I/O hub may transmit the write transaction to the second I/O device (i.e., I/O device B) between times 2 and 3 as MemWr, as shown in FIG. 4. In an embodiment in which the second I/O device is a PCI-E device, the memory write transaction may be sent using a PCI-E header. In other embodiments, for example, where the second I/O hub is coupled to legacy I/O devices via an I/O controller hub, transmission of the memory write may be performed in accordance with a PCI bus, USB bus or an industry standard architecture (ISA) bus in accordance with the Plug and Play ISA Specification, Version 1.0a (published Dec. 4, 2001), or other such protocol.

Figure 5:
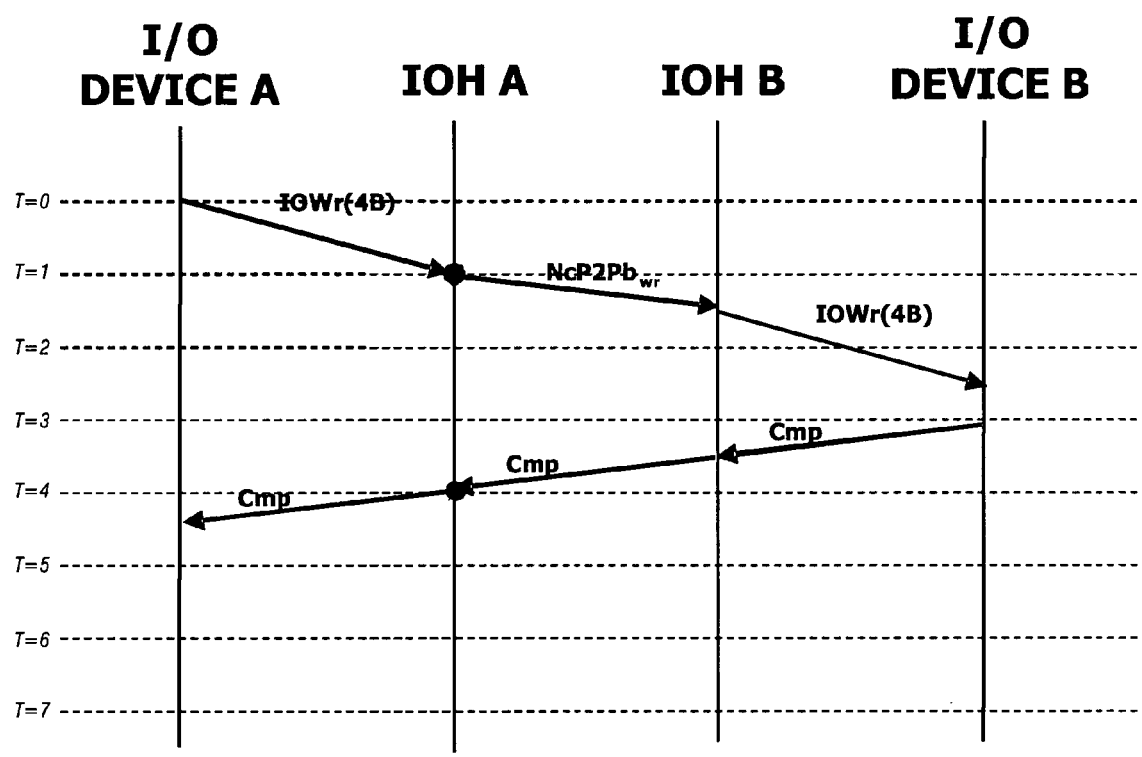
FIG. 5 is a timing diagram of a peer-to-peer I/O write transaction in accordance with an embodiment of the present invention.

Referring now to FIG. 5, shown is a timing diagram of a peer-to-peer I/O write transaction in accordance with an embodiment of the present invention. Such a transaction may be used to transfer data of an I/O space in memory. As shown in FIG. 5, at time T=0, a first I/O device sends an I/O write transaction (IOWr) to a first I/O hub. As shown in the example of FIG. 5, the transaction may be four bytes, although the scope of the present invention is not so limited. At time T=1, the first I/O hub transmits a non-coherent point-to-point write (i.e., $NcP2Pb_{wr}$) with a common system header, the tunneled PCI-E header and I/O data to a second I/O hub. As shown in FIG. 5, the first I/O hub may use a bypass virtual channel to transfer the transaction. The second I/O hub then forwards the tunneled PCI-E header and data to a second I/O device at a time between T=1 and 2.

Upon receipt of the PCI-E I/O write, the second I/O device sends a completion back to the second I/O hub at approximately time T=3. This completion is forwarded from the second I/O hub through the first I/O hub, and is finally received back at the first I/O device, approximately just after time T=4. In various embodiments, the completion may be sent on a completion virtual channel.

A similar flow to that of FIG. 5 may be effective for peer-to-peer write transactions relating to a configuration address space. Note that in certain embodiments, such I/O write or configuration writes may be targeted for an I/O hub of the coherent system, rather than a peer I/O device, thus making the transaction flow simpler.

Embodiments of the present invention may also be used to tunnel non-coherent read transactions between peer devices coupled to a coherent system. In such embodiments, a non-coherent peer-to-peer request may be sent through a coherent system on a first virtual channel. Upon receipt of the request at a target I/O hub of the coherent system, a completion may be sent back to the requesting I/O hub, which deallocates the entry from the requesting I/O hub. In certain embodiments, the non-coherent read request may use a common system header format with no data flits attached thereto. In certain embodiments, any byte alignment allowed in a non-coherent protocol, such as a PCI-E protocol, may be used. The request length of the read request may be encoded in the header sent by the I/O device and tunneled through the coherent system.

Upon receipt of the requested data from the second I/O device, one or more data completions may be returned through the coherent system from the target I/O hub to the requesting I/O hub. In certain embodiments, the target I/O hub may serialize the data completions and the requesting I/O hub may combine the completions up to the maximum payload size of the I/O hub. Then, the maximum payload amount of data may be transmitted from the requesting I/O hub to the requesting I/O device.

Figure 6:
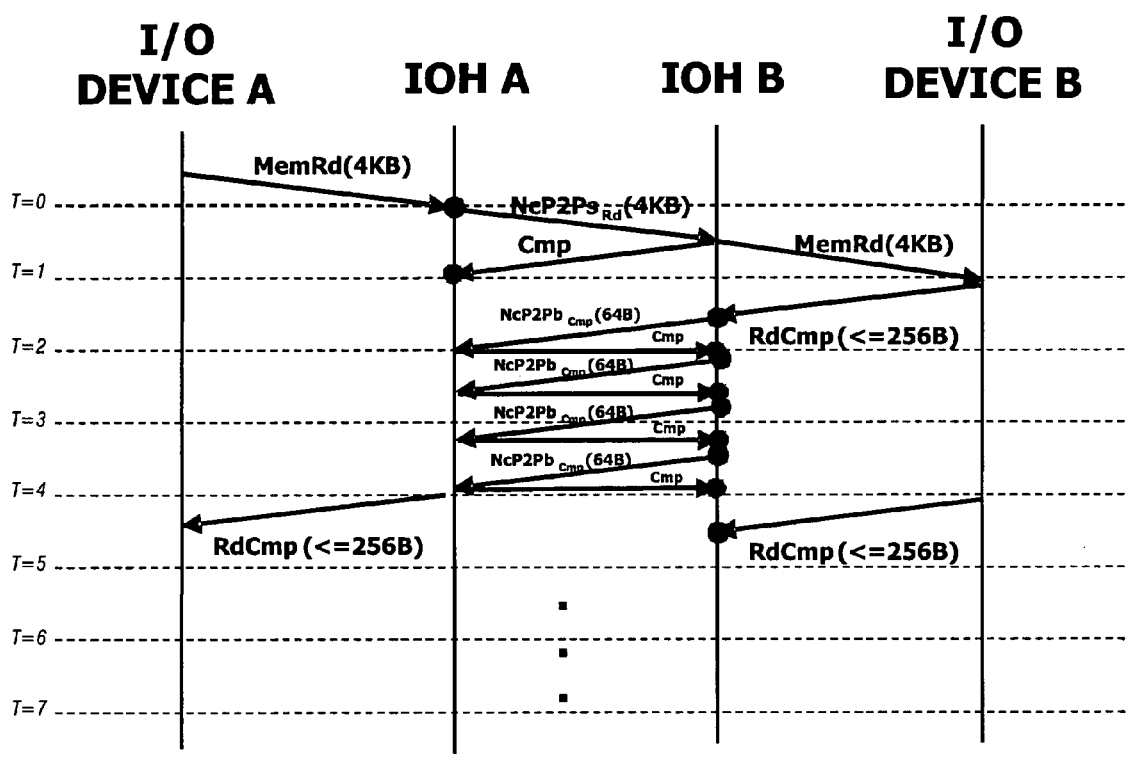
FIG. 6 is a timing diagram of a peer-to-peer memory read transaction in accordance with one embodiment of the present invention.

Referring now to FIG. 6, shown is a timing diagram for a peer-to-peer memory read transaction in accordance with one embodiment of the present invention. As shown in FIG. 6, at a time just prior to T=0, a first I/O device transmits a memory request (MemRd) for memory associated with a second I/O device. As shown in FIG. 6, the memory read request in this example is for four kilobytes (KB) of data. The memory read request is received by a first I/O hub at time T=0. The requesting I/O hub sends a non-coherent peer-to-peer read request ($NcP2Ps_{Rd}$) to a second I/O hub. Such a request may be a tunneled read request using a non-coherent standard virtual channel. In certain embodiments, such a request may use a common system header with no data flits attached and may further include a tunneled non-coherent header (e.g., a PCI-E header in this embodiment).

Upon receipt of the read request at a target I/O hub, the I/O hub sends a completion (Cmp), which is received at the requesting I/O hub at time T=1. In certain embodiments, such completion may be sent on a NDR virtual channel. At the same time, the target I/O hub sends the tunneled PCI-E read request to the second I/O device, which is received thereat at time T=1.

The second I/O device then sends a read completion (RdCmp) which includes less than or equal to 256 bytes of data to the target I/O hub at time T=1. While shown as being such a size in the embodiment of FIG. 6, it is to be understood that data packets of various sizes may be accommodated using embodiments of the present invention. The target I/O hub then sends a plurality of data completions to the requester I/O hub. The data completions may be sent as read requests so that the data may be serialized from the target I/O hub to the requesting I/O hub. In the embodiment shown, each such data completion ($NcP2Pb_{Cmp}$) may include 64 bytes of data. Of course in other embodiments, different byte alignments and lengths may be used. As shown in the embodiment of FIG. 6, the data completions may be sent using a non-coherent bypass virtual channel. In other embodiments, data completions may be sent on another virtual channel. Upon receipt of each such data completion, the requesting I/O hub sends a completion (Cmp) back to the target I/O hub. In one embodiment, the completions may be sent using a NDR standard virtual channel.

The requesting I/O hub then combines the data completion packets into a single PCI-E packet, having less than or equal to 256 bytes that is then sent at time T=4 to the first I/O device as RdCmp. As shown in FIG. 6, the data transfer process (shown between times T=1 and T=5) may be performed multiple times so that the entire requested data amount may be received by the first I/O device.

Figure 7:
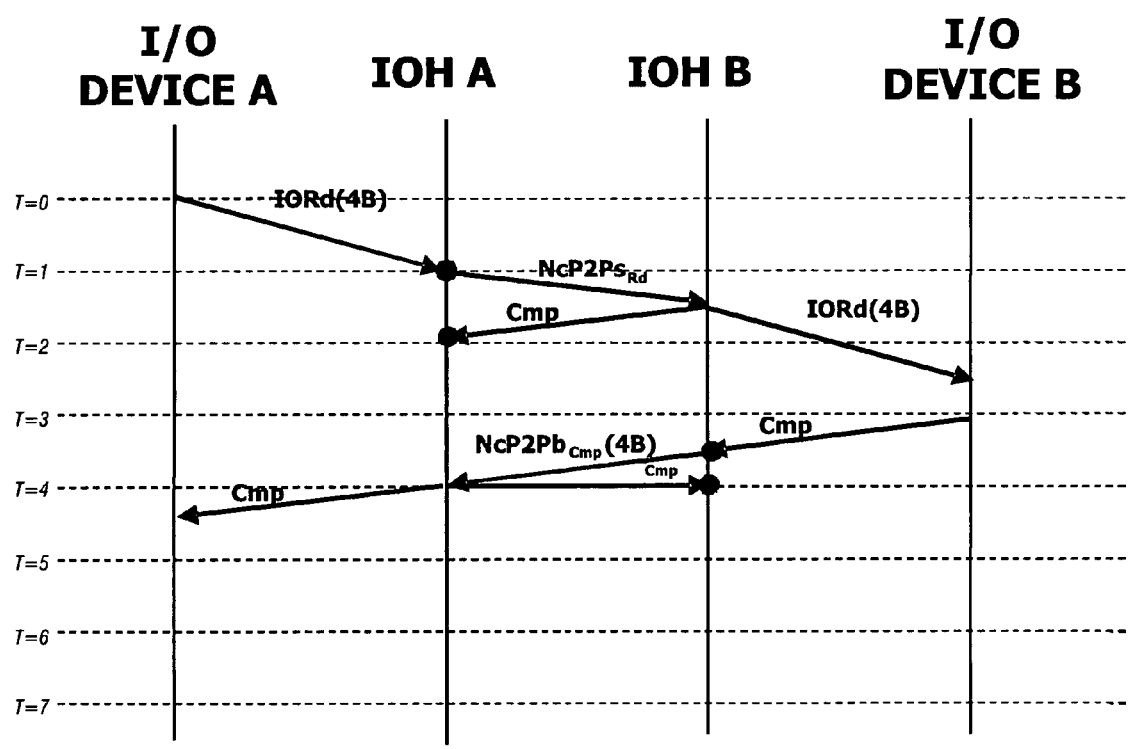
FIG. 7 is a timing diagram of a peer-to-peer I/O read transaction in accordance with an embodiment of the present invention.

Referring now to FIG. 7, shown is a timing diagram of a peer-to-peer I/O read transaction in accordance with an embodiment of the present invention. As shown in FIG. 7, at time T=0, a first I/O device transmits a first I/O read request (IORd) to a first I/O hub. As shown in FIG. 7, the I/O read may be a four byte request, although the scope of the present invention is not so limited. On receipt of the request at the first I/O hub, the first I/O hub sends a non-coherent peer-to-peer read request ($NcP^2Ps_{Rd}$) directed to a second I/O hub at time T=1. In one embodiment, the I/O read request may be forwarded using a non-coherent standard virtual channel. The second I/O hub forwards along a tunneled I/O read request (e.g., in a PCI-E format in this embodiment) to the second I/O device in between times T=1 and 2. At the same time, the second I/O hub sends a completion (Cmp) back to the first I/O hub. In one embodiment, the completion may be sent on a NDR virtual channel.

As shown in FIG. 7, at approximately time T=3 the second I/O device sends a completion to the second I/O hub which includes the four bytes of I/O data. Thus in between times 3 and 4, the second I/O hub transmits the non-coherent peer-to-peer completion to the first I/O hub as $NcP2Pb_{Cmp}$. In certain embodiments, this completion may be sent on a non-coherent bypass virtual channel. Upon receipt of the I/O data, at time T=4 the first I/O sends a completion with the I/O data to the first I/O device and also sends a completion back to the second I/O device.

In certain embodiments, peer-to-peer configuration reads may be performed in the same manner as discussed above for the I/O read transaction. In other embodiments, peer-to-peer messages may be tunneled through a coherent system such that a message a first I/O hub is tunneled through the coherent system using a common system header with non-coherent information tunneled therethrough. At a target I/O hub, the tunneled information is then sent as a message to the second peer I/O device, and a completion may be returned from the second I/O hub to the first I/O hub.

Figure 8:
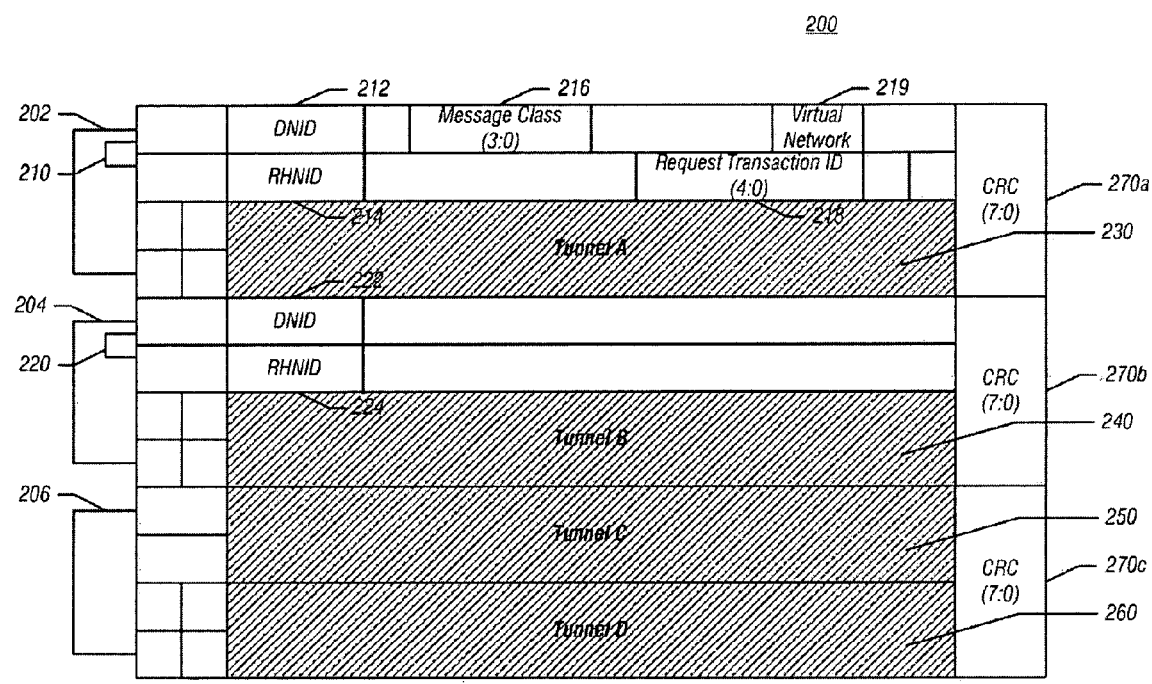
FIG. 8 is a diagram of a tunneled packet in accordance with one embodiment of the present invention.

Referring now to FIG. 8, shown is a diagram of a tunneled data packet in accordance with one embodiment of the present invention. As shown in FIG. 8, a packet 200 includes a system interconnect header formed from a first header portion 210 and second header portion 220, and tunneled information that is divided into four separate segments in the embodiment of FIG. 8 (shown in shaded view), namely tunneled portion A 230, tunneled portion B 240, tunneled portion C 250 and tunneled portion D 260. In one embodiment, the tunneled portions may include a PCI-E header and data from a PCI-E device.

In the embodiment shown in FIG. 8, each line of packet 200 may be twenty bits wide. As shown in FIG. 8, packet 200 may be formed of three flits, namely first flit 202, second flit 204 and third flit 206. While shown in the embodiment of FIG. 8 as including three such flits, it is to be understood that in other embodiments more or different flits or other sized groups of information may be present.

While various header information may be included in a system interconnect header in accordance with an embodiment of the present invention, certain specific types of information are shown in FIG. 8 and are discussed herein. For example, first header portion 210 may include at least certain bits of a destination node ID (DNID) 212 that may be used to identify a destination node for the packet. Similarly, a requestor node ID (RHNID) 214 may be used to identify the requesting node or coherent agent. Also, a message class field 216 may identify a type of message being sent. Request transaction ID field 218 may be used to provide a unique identifier that uniquely identifies the transaction between the requesting coherent agent and a receiving coherent agent. A virtual network identifier 219 may be used to identify which of a plurality of virtual networks of a coherent system may be used to transmit packet 200.

Similarly, second header portion 220 may include further bits of DNID 222 and RHNID 224. In addition to header portions 210 and 220, additional system interconnect header information may be present, as shown in the additional non-shaded portions of packet 200. Different information that may be used in a coherent system may be present in such locations.

Also, cyclic redundancy check (CRC) bits 270a, 270b, and 270c may be provided with each flit to verify proper transmission and receipt of the flits. For example, a link layer of a receiving coherent agent may analyze the CRC bits to determine that the data was properly received. While shown as set forth in FIG. 8, it is to be understood that tunneled packets in accordance with an embodiment of the present invention may vary and may be differently sized, and may include a different header, tunneled and other information.

Embodiments may be implemented in code and may be stored on a storage medium having stored thereon instructions which can be used to program a computer system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions.

Example embodiments may be implemented in software for execution by a suitable computer system configured with a suitable combination of hardware devices. For example, in certain embodiments, various agents of a coherent system, such as I/O hubs, may include code or logic to tunnel peer-to-peer transactions as described above.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

receiving a transaction from a first peer device of a coherent platform at a first agent of the coherent platform, the transaction having first header information;

inserting second header information onto the transaction; and routing the transaction through at least one other agent of the coherent platform to a second peer device of the coherent platform using the second header information.

2. The method of claim 1, further comprising retaining the first header information when transferring the transaction from the first agent to a second agent of the coherent platform via a point-to-point interconnect.

3. The method of claim 2, further comprising routing the transaction from the first agent to the second agent through at least one intermediate coherent device of the coherent platform without translating the first header information.

4. The method of claim 1, wherein the second header information comprises a system interconnect header including a transaction identifier to uniquely identify the transaction between the first agent and the at least one other agent.

5. The method of claim 1, further comprising preserving an end-to-end redundancy check when routing the transaction.

6. The method of claim 1, further comprising receiving the transaction via a first channel of a port of the first agent and routing the transaction from the first agent via a second channel of the port.

7. The method of claim 1, wherein inserting the second header information comprises inserting a first header having information for a first virtual channel and inserting a second header having information for a second virtual channel.

8. A method comprising:
tunneling a transaction from a first peer device coupled to a first hub of a coherent platform to a second peer device coupled to a second hub of the coherent platform through a common system fabric of the coherent platform, wherein information associated with the transaction is preserved through the common system fabric.

9. The method of claim 8, wherein the transaction comprises a write transaction, and the first hub splits the transaction into a plurality of write packets each having a system interconnect header, the information, and a portion of data of the transaction.

10. The method of claim 9, further comprising combining the plurality of write packets in the second hub and transmitting the write transaction to the second peer device and sending a completion packet from the second hub to the first hub after receipt of each of the plurality of write packets.

11. The method of claim 10, further comprising sending the completion packet on a different channel than the plurality of write packets.

12. The method of claim 10, further comprising holding remaining ones of the plurality of write packets in the first hub until receipt of the completion packet from the second hub.

13. The method of claim 8, wherein the transaction comprises a read transaction, and the second hub splits read data from the second peer device into a plurality of read packets each having a system interconnect header, the information, and a portion of the read data.

14. The method of claim 13, further comprising combining the plurality of read packets in the first hub and transmitting the transaction to the first peer device and sending a completion packet from the first hub to the second hub after receipt of each of the plurality of read packets.

15. The method of claim 8, further comprising tunneling a plurality of transactions from the first peer device to the second peer device using a plurality of address spaces including a memory address space, an input/output address space, a configuration address space, and a message address space.

16. The method of claim 8, further comprising receiving the transaction via a first channel of a port of the first hub and forwarding the transaction to the second hub via a second channel of the port.

17. The method of claim 16, wherein tunneling the transaction comprises inserting into the transaction a first header having information for a first virtual channel and inserting a second header having information for a second virtual channel.

18. An article comprising a machine-accessible storage medium containing instructions that if executed enable a system to:
tunnel a transaction from a first peer device coupled to a first hub of a coherent platform to a second peer device coupled to a second hub of the coherent platform through a common system fabric of the coherent platform, wherein information associated with the transaction is preserved through the common system fabric.

19. The article of claim 18, further comprising instructions that if executed enable the system to split a write transaction into a plurality of write packets each having a system interconnect header, the information, and a portion of data of the transaction.

20. The article of claim 19, further comprising instructions that if executed enable the system to combine the plurality of write packets in an agent of the coherent platform and transmit the write transaction to the second peer device and send a completion packet from the agent after receipt of each of the plurality of write packets.

21. An apparatus comprising
a first agent of a coherent platform to tunnel a transaction from a first peer device directly coupled to the first agent to a second peer device directly coupled to a second agent of the coherent platform through a common system fabric of the coherent platform, wherein information associated with the transaction is preserved through the common system fabric.

22. The apparatus of claim 21, wherein the first agent and the second agent comprise input/output hubs of the coherent platform and the first peer device and the second peer device comprise input/output devices.

23. The apparatus of claim 21, wherein the first agent is to receive the transaction via a first channel of a port of the first agent and forward the transaction to the second agent via a second channel of the port.

24. The apparatus of claim 23, wherein the first agent is to insert header information onto the transaction, the header information including a first header having information for a first virtual channel and inserting a second header having information for a second virtual channel.

25. A system comprising
a first peer device; and
a first agent directly coupled to the first peer device to tunnel a transaction from the first peer device to a second peer device directly coupled to a second agent through a common system fabric of the system, the system comprising a coherent platform, wherein information associated with the transaction is preserved through the common system fabric.

26. The system of claim 25, wherein the second agent is coupled to the first agent via a point-to-point interconnect, the second agent to receive the tunneled transaction from the first agent.

27. The system of claim 26, wherein the first agent and the second agent comprise input/output hubs of the coherent platform.

28. The system of claim 25, wherein the first agent is adapted to insert header information onto the transaction, the header information usable to route the transaction to the second agent, wherein the header information includes a first header having information for a first virtual channel and a second header having information for a second virtual channel.

29. The system of claim 28, further comprising a third agent coupled between the first agent and the second agent, the third agent adapted to translate the header information.

* * * * *